United States Patent
Krause et al.

(10) Patent No.: US 8,160,620 B2
(45) Date of Patent: Apr. 17, 2012

(54) DETERMINING MOBILE PHONE NUMBER ASSIGNMENT

(75) Inventors: Kevin R. Krause, Plymouth, MI (US); Thomas A. Gault, Troy, MI (US)

(73) Assignee: General Motors LLC, Detroit, MI (US)

( * ) Notice: Subject to any disclaimer, the term of this patent is extended or adjusted under 35 U.S.C. 154(b) by 980 days.

(21) Appl. No.: 11/864,227

(22) Filed: Sep. 28, 2007

(65) Prior Publication Data
US 2009/0088153 A1    Apr. 2, 2009

(51) Int. Cl.
H04W 4/00    (2009.01)
H04W 72/00    (2009.01)

(52) U.S. Cl. .................. 455/461; 455/432.1; 455/452.1

(58) Field of Classification Search .......... 455/33.1, 455/434, 405, 518, 551, 436, 404.1, 432.1, 455/557, 419, 455; 709/217; 370/331, 216, 370/342; 379/33, 37, 114.01, 114.19
See application file for complete search history.

(56) References Cited

U.S. PATENT DOCUMENTS

| 6,381,470 | B1 * | 4/2002 | Griffith et al. | 455/551 |
|---|---|---|---|---|
| 6,405,038 | B1 * | 6/2002 | Barber et al. | 455/434 |
| 7,912,010 | B2 * | 3/2011 | Ito et al. | 370/331 |
| 2002/0022472 | A1 * | 2/2002 | Watler et al. | 455/405 |
| 2004/0087307 | A1 * | 5/2004 | Ibe et al. | 455/436 |
| 2006/0105795 | A1 * | 5/2006 | Cermak et al. | 455/518 |
| 2006/0294200 | A1 * | 12/2006 | Lee | 709/217 |

FOREIGN PATENT DOCUMENTS

| CN | 1468024 A | 1/2004 |
|---|---|---|
| DE | 690 31 303 T2 | 12/1989 |
| GB | 2 378 098 A | 1/2003 |

OTHER PUBLICATIONS

Official Office action for German Patent Application No. 10 2008 048 904.2 in the name of General Motors Corporation.

* cited by examiner

*Primary Examiner* — Kiet Doan
(74) *Attorney, Agent, or Firm* — Leydig, Voit & Mayer, Ltd.

(57) ABSTRACT

The present invention detects whether an initial mobile number assignment is suboptimal, resulting in excessive roaming. If excessive roaming is encountered, the telematics service provider determines the effective home area of the telematics unit and assigns an appropriate replacement number to the unit. In this way, the disclosed principles allow a telematics service provider to decrease its roaming charges, and/or those of its users, and more optimally manage its mobile phone number assignments.

15 Claims, 6 Drawing Sheets

DETERMINING MOBILE PHONE NUMBER ASSIGNMENT

BACKGROUND OF THE INVENTION

Many vehicles have mobile communication systems integrated into the vehicle prior to retail sale. Such mobile communication systems must typically be configured before departure from the dealer premises; however, sometimes the initial settings associated with such systems can become suboptimal. For example, each mobile communication system is associated with a mobile telephone number that is used to determine the status of the device. In this example, a device may be considered in its home area if it is within certain geographical bounds and may be considered to be "roaming" when it is outside of such bounds. Since calls made while roaming typically incur user costs substantially beyond those incurred while not roaming, it is important to ensure that the initial configuration and registration supply an appropriate mobile number.

However, because of initial dealer error or a change in user home location, the assigned mobile number may be, or may become, suboptimal. In this case, a user or the service provider will incur costs beyond what they would incur if the device were optimally configured.

This background is provided for the reader's convenience, and there is no intent to limit the invention to only those implementations that solve the problems noted above. Moreover, to the extent that words of disparagement or distinction are used herein with respect to certain features, the intent is simply to highlight a preferred course or implementation, and not to remove the criticized or distinguished elements or aspects from the scope of the appended claims, unless otherwise clearly indicated by context.

BRIEF SUMMARY OF THE INVENTION

In one aspect, a system in accordance with the disclosed principles detects whether a mobile communications device is roaming for a percentage of time that exceeds a predetermined threshold. If the mobile communications device is roaming for a percentage of time that exceeds the predetermined threshold, the telematics service provider determines a corresponding new home area for the device and reassigns it with a more appropriate phone number. In this manner, a telematics service provider may decrease its roaming charges and properly manage its mobile phone assignments to its telematics units.

BRIEF DESCRIPTION OF THE SEVERAL VIEWS OF THE DRAWING(S)

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
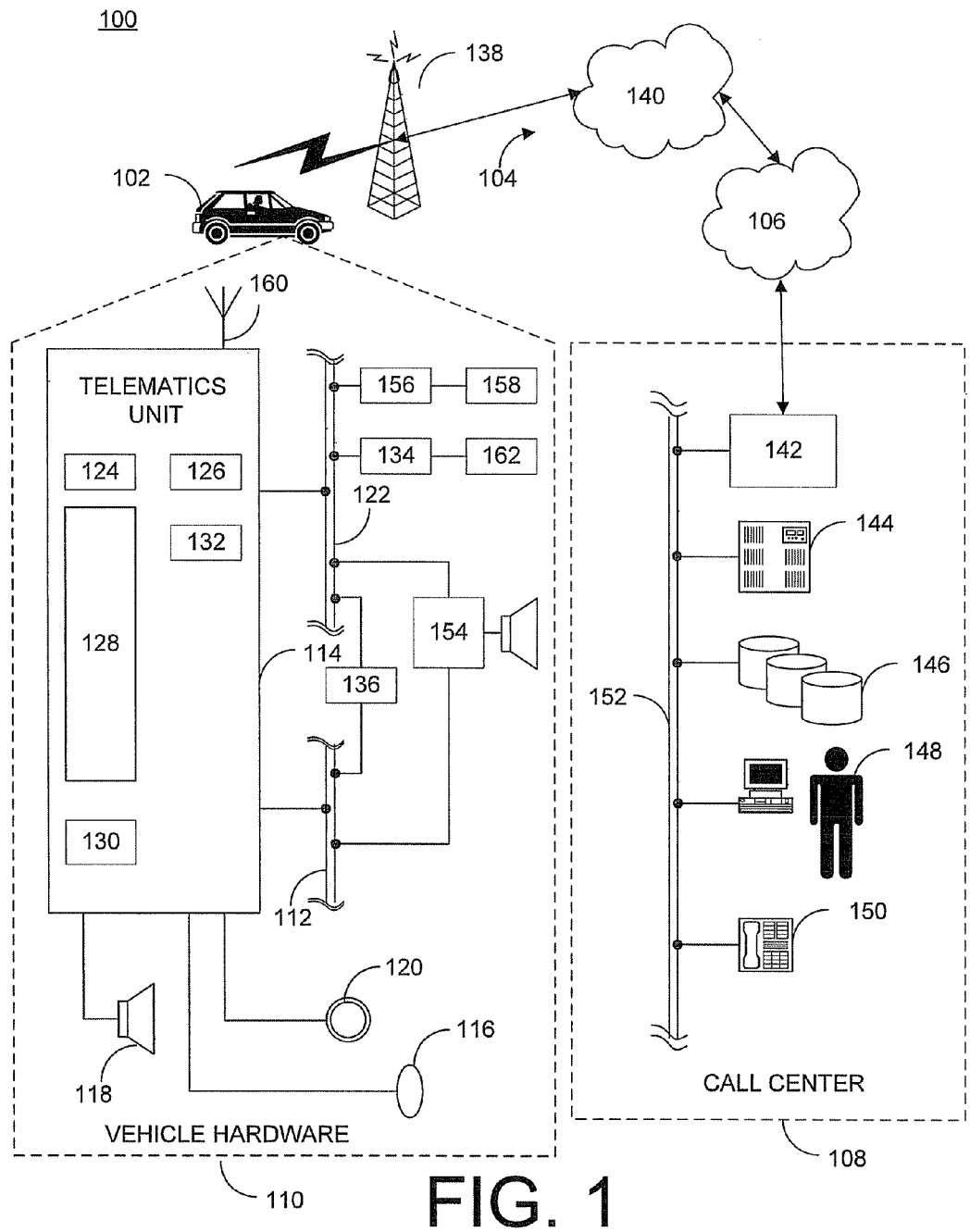
FIG. 1 is a schematic view of an example communication system within which examples of the present invention may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
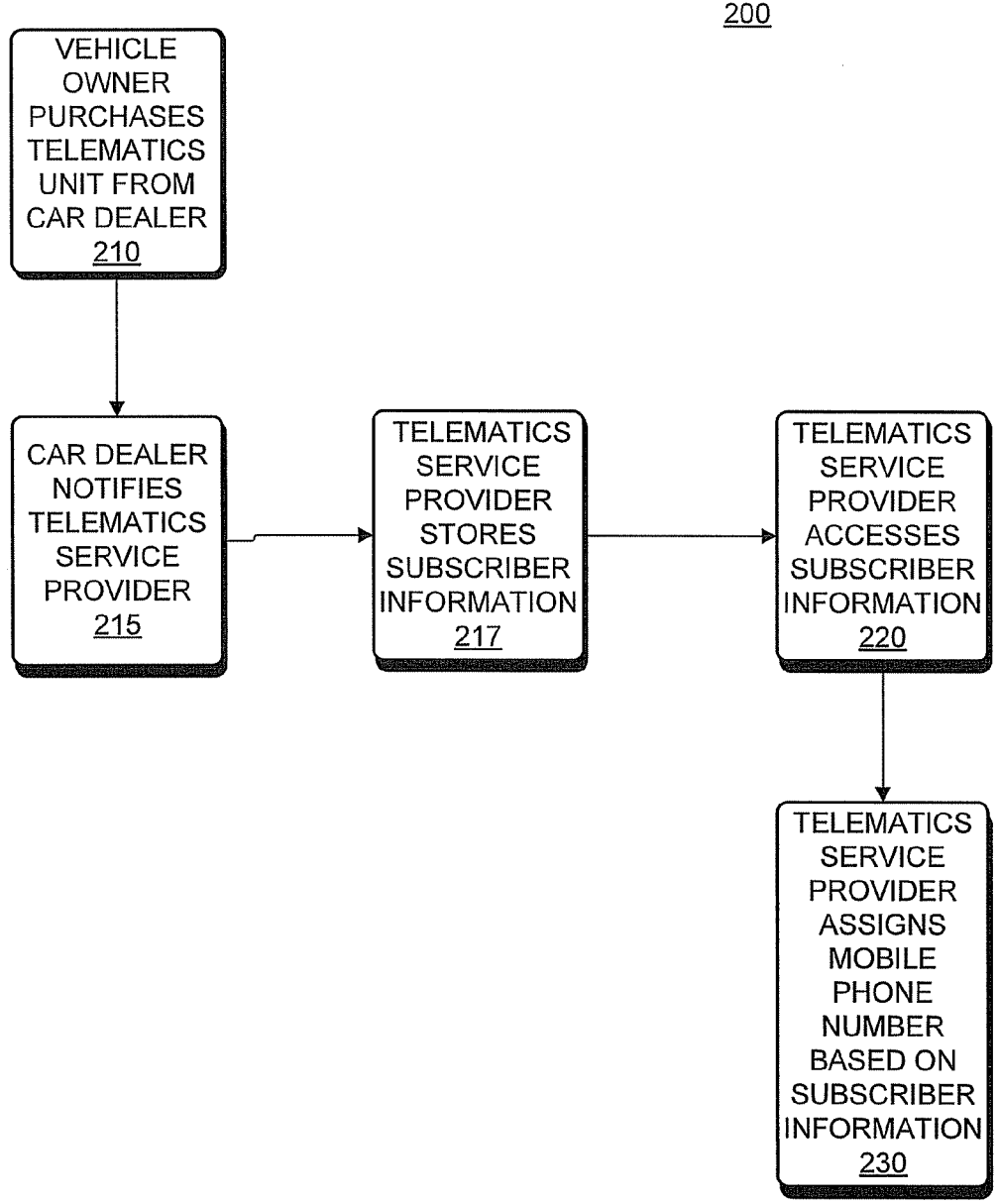
FIG. 2 is a flow diagram illustrating an exemplary method for assigning a mobile phone number to a newly purchased telematics unit in accordance with the disclosed principles.

As noted above, in one aspect, a system in accordance with the disclosed principles detects whether a mobile communications device is operating in a suboptimal manner with respect to its assigned mobile number and reassigns a more appropriate phone number based on certain criteria. FIG. 2 is a flow diagram 200 illustrating a method for initially assigning a mobile phone number to a newly purchased telematics unit usable in accordance with an aspect of the invention.

When a telematics service provider first configures a telematics unit, it is assigned a mobile phone number. A telematics service provider may have several mobile phone numbers in reserve from various wireless carriers to assign to telematics units across the country. In the illustrated example, a vehicle with a telematics unit is purchased from a car dealer in stage 210 of process 200. At stage 215, the car dealer notifies the telematics service provider that a telematics unit equipped vehicle has been sold. The telematics service provider then stores subscriber information as well as the serial number (or other identifying number or indicia) of the telematics unit in its database at stage 217. Subscriber information may include, but is not limited to, an area code and exchange previously assigned to a subscriber communication and/or telephony device, residential and/or business address and car dealer address. The area code and exchange previously assigned to a subscriber may be a separate residential land line, wireless communication device such as a cellular phone, or other wireless communication device. When subsequently preparing to assign a mobile phone number to the newly purchased telematics unit, the telematics service provider accesses the subscriber information at stage 220. Consequently, the telematics service provider assigns the telematics unit a mobile phone number based on the subscriber information at stage 230.

However, there may be times that the vehicle owner may change residences or make calls in another geographic region that is not indicated by the subscriber information. Consequently, the mobile number assigned to the telematics unit may cause the telematics unit to be in a predominantly roaming state while in its effective home area, meaning the area near the residence of the owner, causing the telematics service provider or user to incur unnecessary roaming charges. In one aspect of the disclosed principles, the service provider detects whether a telematics unit is in a predominantly roaming state within its effective home area and reassigns a mobile phone number to the telematics unit to decrease roaming costs to the telematics service provider. In other words, the unit's assigned home area is dynamically varied to more closely match the unit's effective home area.

Figure 3:
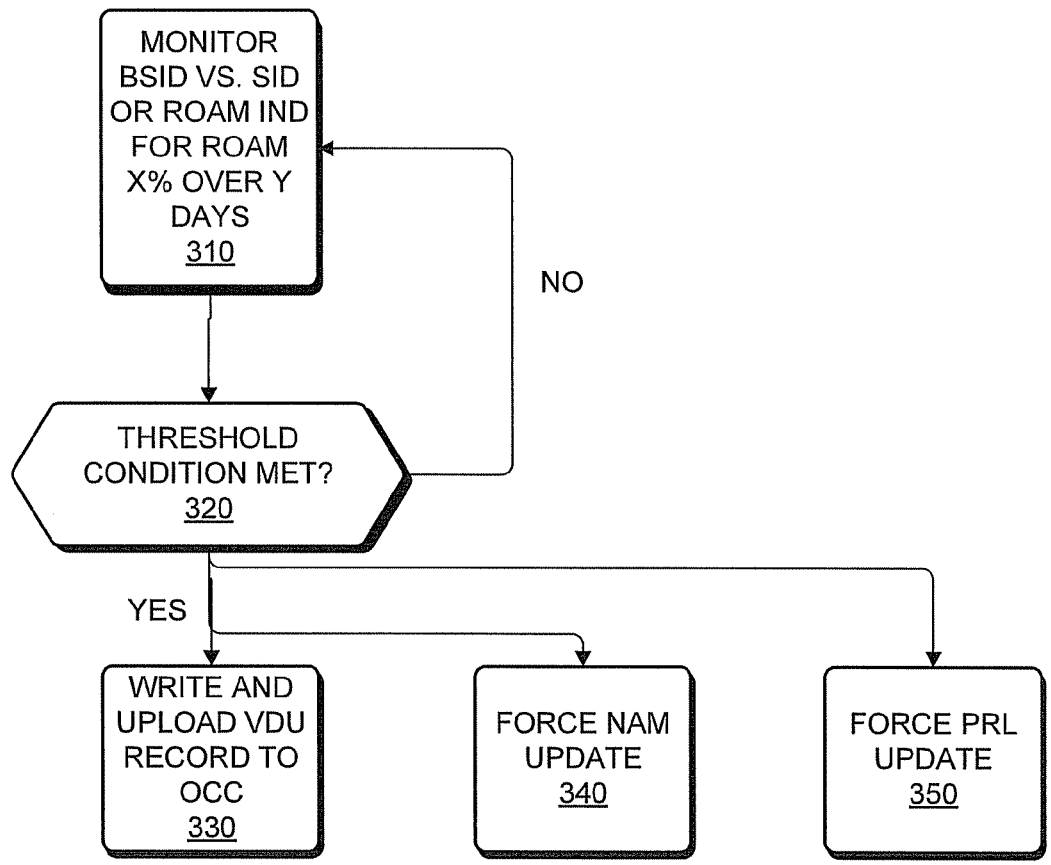
FIG. 3 is a flow diagram illustrating an exemplary method for determining a proper mobile phone number assignment in accordance with the disclosed principles.

FIG. 3 is a flow diagram 300 illustrating an exemplary method for determining proper mobile phone number assignment for a telematics unit according to these principles. At stage 310 of process 300, the telematics unit monitors the broadcast system identification (BSID) number and compares it to its home system identification (SID) number while the telematics unit is in an idle state. In one example the idle state includes the telematics unit being registered with network 104 and not in an active voice or data call state, wherein the billing system of the wireless carrier is not active while the telematics unit is in an idle state. A SID identifies a particular wireless carrier. Therefore, a telematics unit's home SID identifies its home wireless carrier. Similarly, the BSID that the telematics unit receives identifies the wireless carrier it is currently residing in. Thus, if the BSID does not match the home SID, then the telematics unit is in a roaming wireless area. Furthermore, a telematics unit may have a roam indicator to notify the call center that it is outside its home area. Thus, in stage 310, the telematics unit monitors for an arbitrary number of days (e.g. 30 days) whether it is roaming.

At stage 320, the telematics unit determines whether a threshold condition is met with respect to its roaming behavior. For example, it may determine whether the telematics unit is roaming 90% or more of the time elapsed within a 30 day period. If not, then the telematics unit continues to monitor whether it is roaming 310. However, if it is determined that the telematics unit is roaming 90% or more of the time, then at stage 330 the call center commands the telematics unit to write and upload a Vehicle Data Upload (VDU) record to the call center. It will be understood that the determination that the unit is roaming excessively may be independently made by the call center or the results of stage 320 may be sent to the call center by the telematics unit.

At stage 340, the call center forces the telematics unit to update its number assignment module (NAM) with a new mobile phone number from its effective home area. The call center then optionally forces the telematics unit to update its preferred roaming list (PRL) according to the telematics unit's new assigned home area at stage 350.

Figure 4:
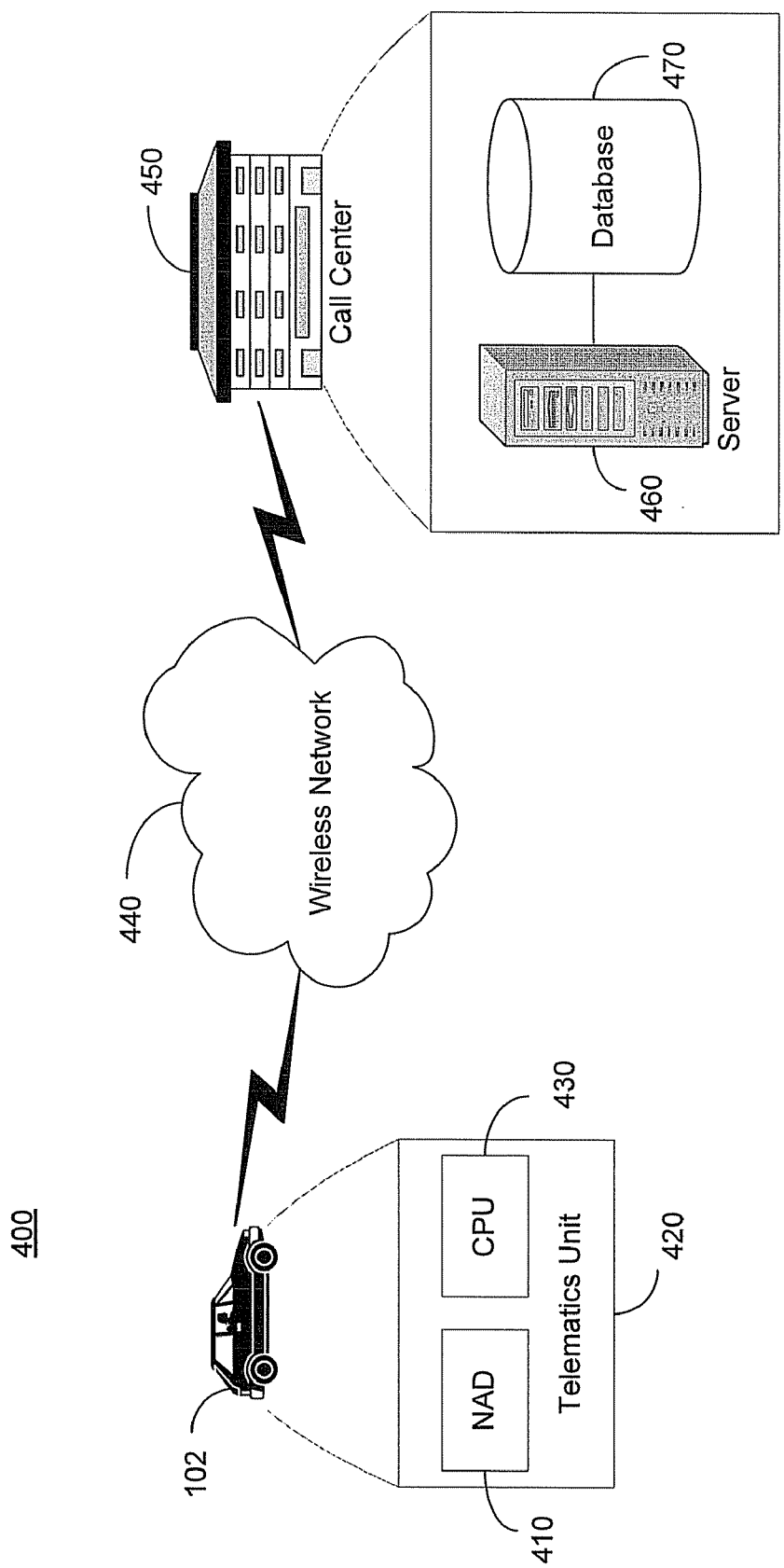
FIG. 4 illustrates a general architectural overview of a system contemplated by an exemplary implementation.
Figure 5:
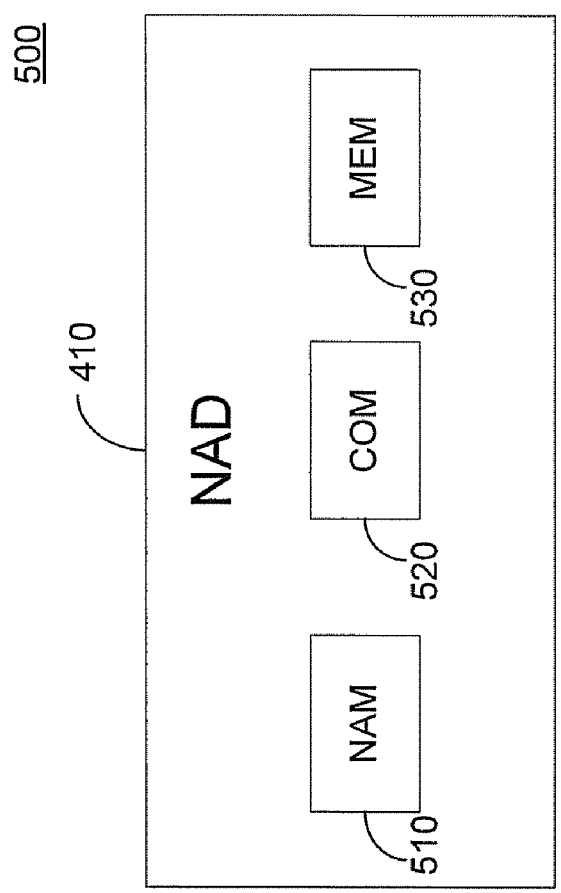
FIG. 5 illustrates an exemplary functional diagram of a network access device in accordance with the disclosed principles.

FIG. 4 illustrates a general architectural overview of a system 400 in accordance with an exemplary implementation. A vehicle 102 contains a telematics unit 420 that comprises a network access device (NAD) 410 and central processing unit (CPU) 430. The NAD may communicate across a wireless network 440 to a call center 450. The call center 450 may contain infrastructure that includes a server 460 and a database 470, and may be the same as or similar to call center 108 discussed with reference to FIG. 1. The NAD may comprise wireless communication components 510, NAM 520 and memory 530 containing the roam indicator and home SID (See FIG. 5).

The telematics service provider assigns a mobile phone number to a newly purchased telematics unit 420 by accessing the database 470 to retrieve the subscriber information associated with the telematics unit. Once the subscriber information is determined, then a server 460 accesses a database of mobile phone numbers from the subscriber's home area. A server 460 facilitates communication from the call center 450 to the vehicle's telematics unit to assign it a new mobile phone number.

Figure 6:
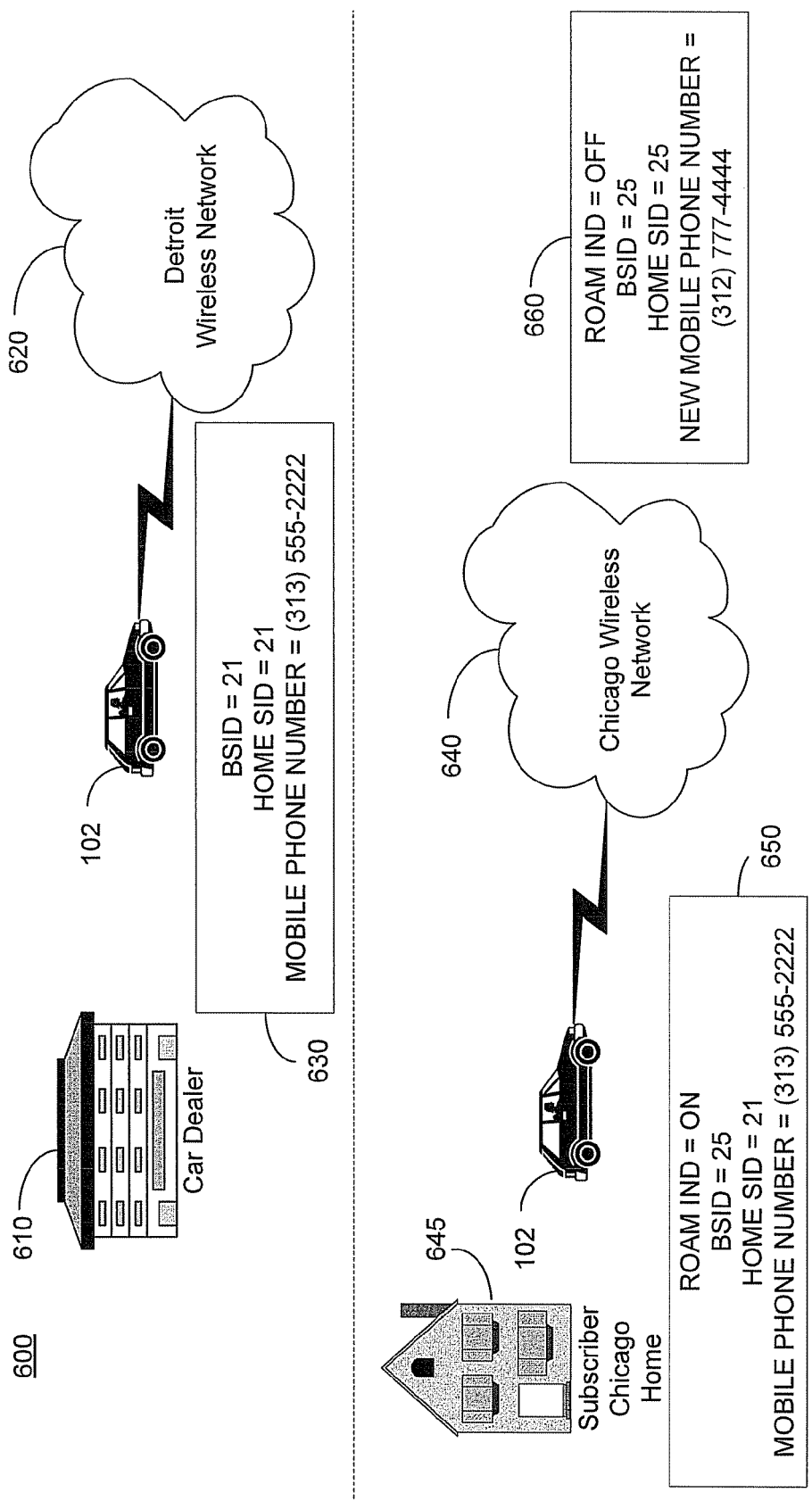
FIG. 6 illustrates a general architectural overview of a system contemplated within an exemplary implementation.

Monitoring the BSID and home SID without monitoring the roam indicator does not allow a telematics service provider to properly manage its mobile phone number assignments. FIG. 6 illustrates an example. Suppose a vehicle owner purchased a telematics unit equipped vehicle 102 in Detroit 610 but resides in Chicago 645. In addition, suppose a wireless carrier provides wireless service in both Detroit and Chicago (620, 640). The telematics service provider assigns a new mobile phone number with a Detroit area code and home SID when the vehicle and telematics unit is purchased 630. Thus, when the vehicle is in Chicago, the roam indicator would show that its telematics unit is not roaming 650 (hence the telematics service provider is not incurring unnecessary roaming charges) because the same wireless carrier is in Chicago and Detroit. However, the telematics unit home SID would differ from the BSID 650. Thus, a telematics service provider would reassign a mobile phone number (given that a threshold condition is met 320) to a Chicago mobile number 660.

Thus, using the disclosed principles the telematics service provider is able to properly manage the assignment of mobile phone numbers to telematics units 660. With respect to the disclosure, it will be appreciated that all references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for determining a mobile phone number assignment for a mobile wireless communication device to decrease the extent to which the device is in the roaming condition, the method comprising in order:
    assigning a first mobile phone number to the device, wherein the first mobile phone number is associated with a first home area;
    determining whether the device is in a roaming condition with greater than a predetermined frequency when assigned the first mobile phone number; and automatically assigning a second mobile phone number to the device, replacing the first mobile phone number if it is determined that the device is in the roaming with greater than the predetermined frequency, wherein replace of the first number with the second number reduces the frequency with which the device is in the roaming condition;
    wherein determining whether the device is in a roaming condition with greater than a predetermined frequency comprises monitoring a roam indicator stored within a memory of the device.

2. The method according to claim 1, wherein determining whether the device is in a roaming condition with greater than a predetermined frequency comprises: monitoring a broadcast system identification number of a wireless carrier where the device is currently active; and comparing the broadcast system identification number to a home system identification number.

3. The method according to claim 2, wherein the home system identification number is stored within a memory module of the device.

4. The method according to claim 1, further comprising storing a vehicle data upload within a database of a service provider call center if it is determined that the device is in a roaming condition with greater than a predetermined frequency.

5. The method according to claim 1, wherein determining whether the device is in a roaming condition with greater than a predetermined frequency comprises determining whether the amount of time that the device is in the roaming condition exceeds a predetermined proportion of the amount of time that the device is active.

6. The method according to claim 1, wherein automatically assigning a second mobile phone number to the device further comprises updating a number assignment module of the telematics unit by provision the second mobile phone number for the telematics unit.

7. The method according to claim 1, wherein assigning a first mobile phone number to the device further comprises: receiving notification of a newly purchased telematics unit from a telematics equipped vehicle dealer; and assigning a mobile phone number to a telematics unit based on subscriber information.

8. A method for reconfiguring a telematics device to reduce the frequency with which the device is in a roaming mode, the device having an assigned mobile communication number associated with a home area, the device being capable of communicating wirelessly with one or more remote entities, the method comprising:
    during an evaluation period, observing one or more wireless communications involving the telematics device; measuring a frequency with which the one or more wireless communications are executed by the telematics device while roaming outside of the home area;
    determining whether the frequency with which the one or more wireless communications are executed while roaming exceeds a roaming limit; and reconfiguring the telematics device by assigning a replacement mobile communication number to the device if use of the replacement mobile communication number during the evaluation period would have decreased the frequency with which the one or more wireless communications were executed while roaming;
    wherein measuring the frequency with which the wireless communications are executed while roaming comprises: monitoring a broadcast system identification number of a wireless carder where the device is currently active; and comparing the broadcast system identification number to a home system identification number.

9. The method according to claim 8, wherein determining whether the frequency with which the one or more wireless communications are executed while roaming exceeds a roaming limit comprises determining whether the percentage of time spent roaming during the evaluation period exceeds a predetermined percentage.

10. A method for determining a mobile phone number assignment for a mobile wireless communication device, the method comprising in order:
    assigning a first mobile phone number to the device, wherein the first mobile phone number is associated with a first home area; determining whether the device is in a roaming condition with more than a predetermined frequency when assigned the first mobile phone number; and automatically assigning a second mobile phone number to the device, replacing the first mobile phone number if it is determined that the device is in the roaming condition with more than the predetermined frequency, so as to decrease the frequency with which the device is in the roaming condition;
    wherein determining whether the device is in a roaming condition with more than a predetermined frequency comprises: monitoring a broadcast system identification number of a wireless carrier where the device is currently active; and comparing the broadcast system identification number to a home system identification number.

11. The method according to claim 10, wherein the home system identification number is stored within a memory module of the device.

12. The method according to claim 10, further comprising storing a vehicle data upload within a database of a service provider call center if it is determined that the device is in a roaming condition with more than a predetermined frequency.

13. The method according to claim 10, wherein determining whether the device is in a roaming condition with more than a predetermined frequency comprises determining whether the amount of time that the device is in the roaming condition exceeds a predetermined proportion of the amount of time that the device is active.

14. The method according to claim 10, wherein automatically assigning a second mobile phone number to the device further comprises updating a number assignment module of the telematics unit by provision the second mobile phone number for the telematics unit.

15. The method according to claim 10, wherein assigning a first mobile phone number to the device further comprises: receiving notification of a newly purchased telematics unit from a telematics equipped vehicle dealer; and assigning a mobile phone number to a telematics unit based on subscriber information.

* * * * *